US012466352B2

(12) United States Patent
Syrcle

(10) Patent No.: US 12,466,352 B2
(45) Date of Patent: Nov. 11, 2025

(54) RESTRAINT SYSTEMS AND RESTRAINT SYSTEM METHODS

(71) Applicant: Advanced Concepts in Manufacturing LLC, Spokane Valley, WA (US)

(72) Inventor: Mike Syrcle, Spokane Valley, WA (US)

(73) Assignee: ADVANCED CONCEPTS IN MANUFACTURING LLC, Spokane Valley, WA (US)

( * ) Notice: Subject to any disclaimer, the term of this patent is extended or adjusted under 35 U.S.C. 154(b) by 589 days.

(21) Appl. No.: 17/322,843

(22) Filed: May 17, 2021

(65) Prior Publication Data
US 2021/0270295 A1 Sep. 2, 2021

Related U.S. Application Data

(63) Continuation-in-part of application No. 15/916,094, filed on Mar. 8, 2018, now Pat. No. 11,007,960.
(Continued)

(51) Int. Cl.
*B60R 21/02* (2006.01)
*F15B 1/24* (2006.01)
(Continued)

(52) U.S. Cl.
CPC ............... *B60R 21/02* (2013.01); *F15B 1/24* (2013.01); *F15B 15/202* (2013.01);
(Continued)

(58) Field of Classification Search
CPC ........ F15B 2015/268; F15B 2211/3058; F15B 2211/20561; F15B 2211/30515;
(Continued)

(56) References Cited

U.S. PATENT DOCUMENTS 2,872,901 A 2/1959 Goldring et al.
3,393,010 A 7/1968 Steinberg
(Continued)

FOREIGN PATENT DOCUMENTS

EP 3098457 A1 11/2016

*Primary Examiner* — Dustin T Nguyen
(74) *Attorney, Agent, or Firm* — Wells St. John P.S.

(57) ABSTRACT

Passenger restraint systems are provided. The restraint systems can include: a passenger seat supported by a frame; a restraint bar pivotably attached to the frame; and at least one piston operably engaged between the restraint bar and the frame. Restraint system pistons are provided. The pistons can include: a central chamber housing a piston head and rod; a fluid reservoir in fluid communication with the central chamber; and at least one electromechanical valve operable between an open and a closed position. Methods for restraining a passenger within a seat are also provided.

Manually operable piston assemblies are provided that can include a piston head within a cylinder, the piston head separating fluid in the cylinder to define rod-side fluid and head-side fluid. The piston assembly can be configured to operate in at least six positions, including but not limited to a first position of locking retract static; a second position of locking retract extend flow; a third position of locking retract flow; a fourth position of locking extend static; a fifth position of locking extend retract flow; and a sixth position of locking extend flow. Manually operable piston assemblies are also provided that can include a piston head within a cylinder, with the piston head separating fluid in the cylinder to define rod-side fluid and head-side fluid. The manually operable piston assembly can further be configured to operate in at least six positions that include a first position of locking extend static; a second position of extend movement flow; a third position of manual override retract flow; a fourth position of manual override extend flow; a fifth position of locking retract static; and a sixth position of retract movement flow.

(Continued)

Methods for operating a manually operable piston are also provided. The methods can include applying pressure to retract the piston rod and allow head-side fluid to pass through piston head passageway and mix with rod-side fluid. Methods for operating a manually operable piston can also include applying pressure to extend or retract the piston rod and allow head-side fluid to pass through at least one valve and mix with rod-side fluid.

4 Claims, 24 Drawing Sheets
(4 of 24 Drawing Sheet(s) Filed in Color)

Related U.S. Application Data

(60) Provisional application No. 62/485,169, filed on Apr. 13, 2017.

(51) Int. Cl.
  *F15B 15/20* (2006.01)
  *F15B 15/26* (2006.01)
  *A63G 31/00* (2006.01)
  *B60R 21/00* (2006.01)

(52) U.S. Cl.
  CPC ............ *F15B 15/204* (2013.01); *A63G 31/00* (2013.01); *B60R 2021/0097* (2013.01); *B60R 2021/022* (2013.01); *B60R 2021/028* (2013.01); *F15B 2015/268* (2013.01)

(58) Field of Classification Search
  CPC ........ F15B 15/204; F15B 1/24; F15B 15/202; B60R 21/02; B60R 2021/0097; B60R 2021/022; B60R 2021/028; A63G 31/00
  See application file for complete search history.

(56) References Cited

U.S. PATENT DOCUMENTS

| | | | |
|---|---|---|---|
| 3,633,966 A | 1/1972 | Epple et al. | |
| 3,889,969 A | 6/1975 | Otani | |
| 4,005,877 A | 2/1977 | Humphries | |
| 4,478,129 A | 10/1984 | Hannes et al. | |
| 4,531,459 A | 7/1985 | Yamada | |
| 5,060,932 A | 10/1991 | Yamaguchi | |
| 5,529,382 A | 6/1996 | Burkat | |
| 5,784,943 A | 7/1998 | Kahra | |
| 5,984,741 A | 11/1999 | Nakamura et al. | |
| 6,159,061 A | 12/2000 | Gorokawa | |
| 6,220,171 B1 | 4/2001 | Hettema et al. | |
| 6,487,955 B1 | 12/2002 | Nishi | |
| 6,588,556 B2 | 7/2003 | Strobel et al. | |
| 6,637,341 B2 | 10/2003 | Kroon et al. | |
| 6,971,316 B2 | 12/2005 | Hansen et al. | |
| 7,204,559 B2 | 4/2007 | Berra | |
| 7,677,671 B2 | 3/2010 | Steininger et al. | |
| 7,947,943 B2 | 5/2011 | Jaskol et al. | |
| 8,132,514 B2 | 3/2012 | Lubman et al. | |
| 8,157,067 B2 | 4/2012 | Ruthinowski et al. | |
| 8,204,655 B2 * | 6/2012 | Tomita | E02F 3/404 |
| | | | 414/730 |
| 8,308,245 B2 | 11/2012 | Roodenburg et al. | |
| 9,080,310 B2 * | 7/2015 | Knussman | E02F 9/2217 |
| 9,346,429 B2 | 5/2016 | Sutherland | |
| 9,523,184 B2 * | 12/2016 | Kim | F15B 11/048 |
| 9,702,383 B2 * | 7/2017 | Ogawa | F15B 15/18 |
| 9,914,428 B2 | 3/2018 | Zamperia | |
| 10,309,429 B2 * | 6/2019 | Gomm | F15B 13/044 |
| 10,569,731 B2 | 2/2020 | Thiele | |
| 11,007,960 B1 | 5/2021 | Syrcle et al. | |
| 11,135,988 B2 | 10/2021 | Zurcher et al. | |
| 11,731,574 B2 | 8/2023 | Syrcle et al. | |
| 2002/0068640 A1 | 6/2002 | Uemura et al. | |
| 2002/0070599 A1 | 6/2002 | Berra | |
| 2008/0054617 A1* | 3/2008 | Schwant | F15B 15/204 |
| | | | 280/806 |
| 2015/0210238 A1 | 7/2015 | Biegun | |
| 2015/0232059 A1 | 8/2015 | Zamperla | |
| 2019/0184935 A1 | 6/2019 | Blum | |
| 2020/0180556 A1 | 6/2020 | Bruno et al. | |
| 2020/0298783 A1 | 9/2020 | Zurcher et al. | |
| 2021/0069603 A1 | 3/2021 | Ahle | |

* cited by examiner

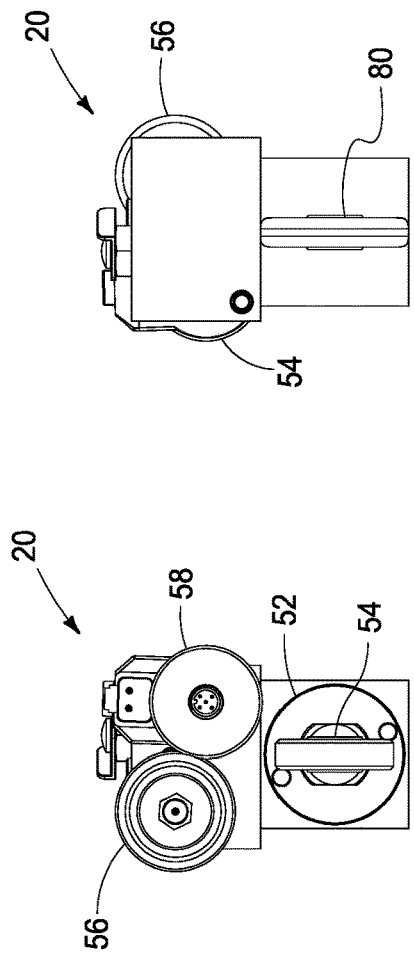
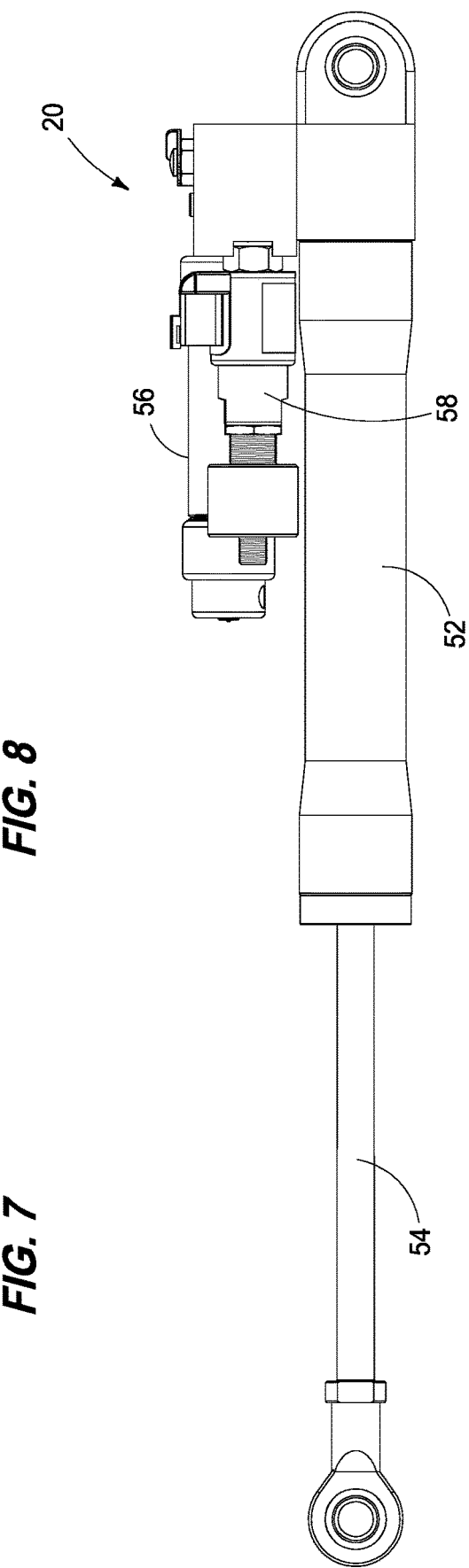
FIG. 8
FIG. 7
FIG. 6

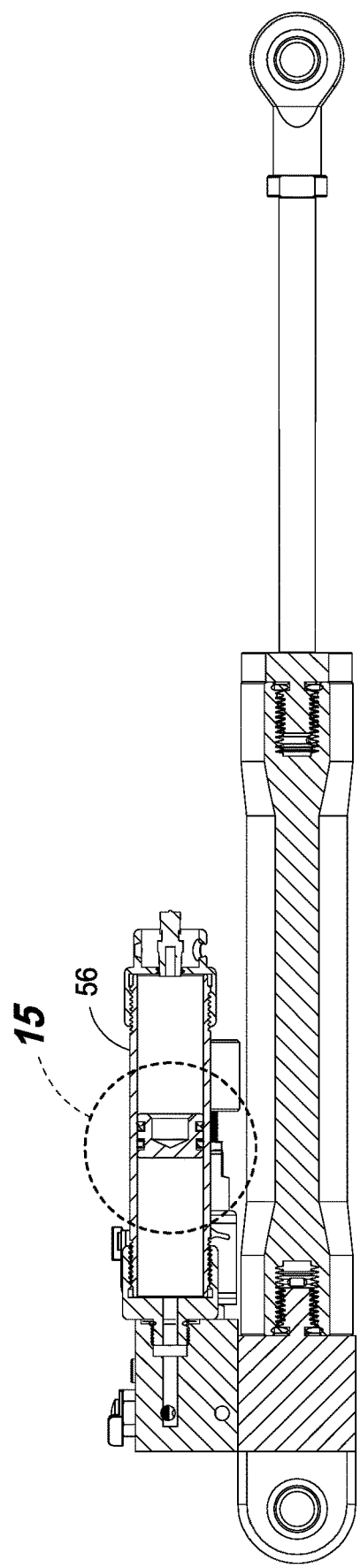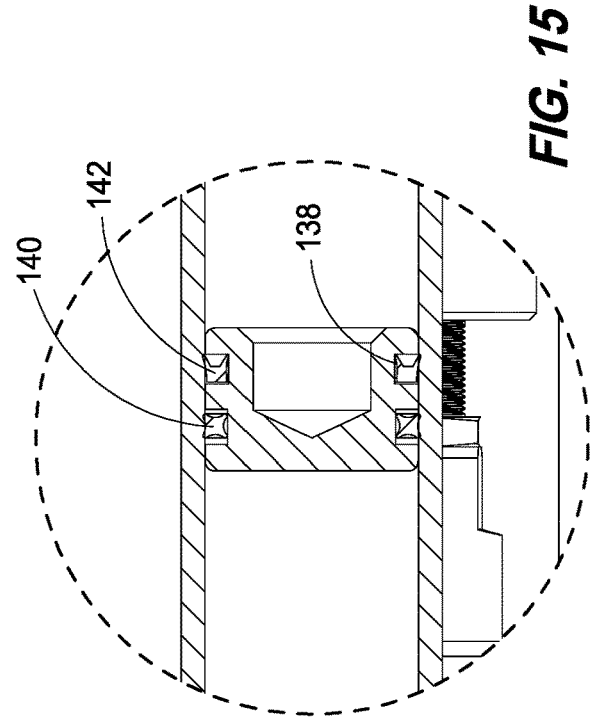

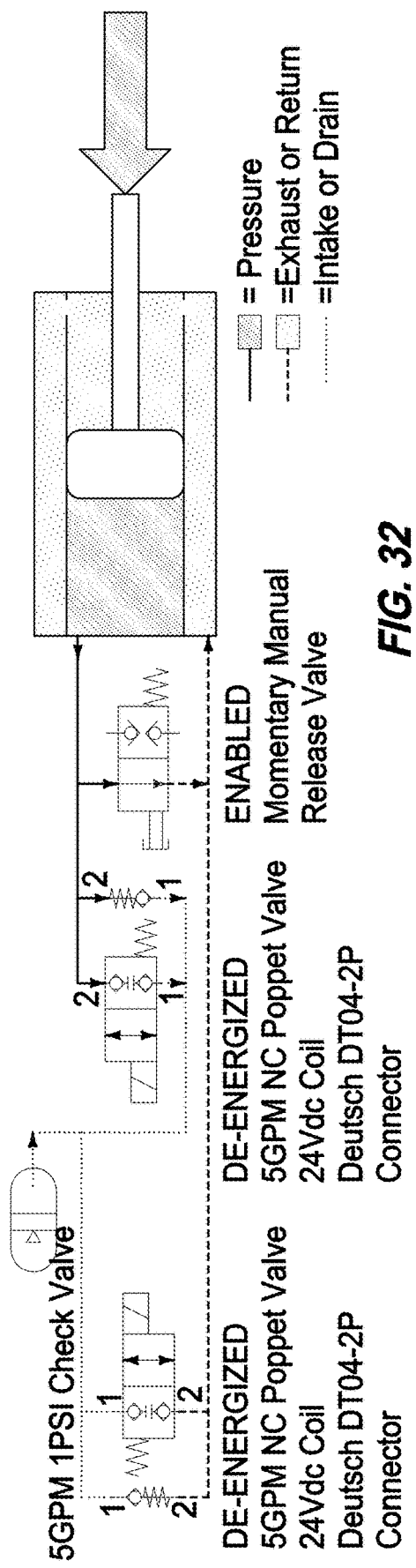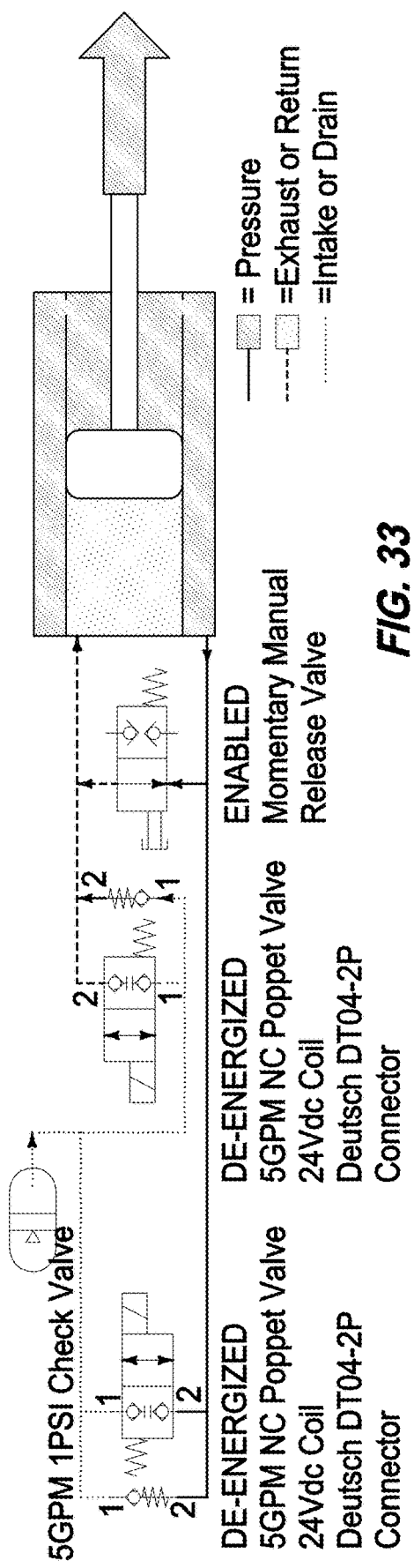

RESTRAINT SYSTEMS AND RESTRAINT SYSTEM METHODS

CROSS REFERENCE TO RELATED APPLICATION

This application is a Continuation-In-Part of U.S. patent application Ser. No. 15/916,094 which was filed Mar. 8, 2018, which claims priority to and the benefit of U.S. provisional patent application Ser. No. 62/485,169 which was filed Apr. 13, 2017, entitled "Restraint Systems and Restraint System Methods", the entirety of which is incorporated by reference herein.

TECHNICAL FIELD

The present disclosure relates to restraint systems and restraint system methods. In accordance with example implementations, these systems and methods can be utilized in connection with amusement park rides for example. Accordingly, example amusement park rides can include lap restraints that are operatively coupled to the frame of a car of the ride with a locking cylinder of the present disclosure as well as the locking cylinder in associated monitoring systems of the present disclosure. The present disclosure provides piston fluid systems and/or methods.

BACKGROUND

Restraint systems are becoming increasingly important in amusement rides throughout the country. These restraint systems provide a rider with safety while experiencing varying G-forces about a ride for entertainment purposes. Previously, these restraint systems have taken the form of lap bars that can be pulled into place upon seating of the rider, and then engaged to remain in that place throughout the ride, and then released from that position upon ride completion. Accordingly, typical rides will require a rider to sit in place, pull the lap restraint toward the lap of the rider, and then prior to the ride commencing, a separate attendant will manually walk by each rider and pull the restraint away from the lap, and if the restraint does not move, then that seat is ready to be ridden in. The systems and methods of the present disclosure overcome the shortcomings of these prior art systems.

SUMMARY

Passenger restraint systems are provided. The restraint systems can include: a passenger seat supported by a frame; a restraint bar pivotably attached to the frame; and at least one piston operably engaged between the restraint bar and the frame, the piston moveable between a first position engaging the passenger in the seat and a second position disengaged from the passenger in the seat, wherein the piston comprises a cylinder head housing a pair of check valves.

Amusement ride passenger restraint systems are provided. The systems can include: a passenger seat attached to an amusement ride cart support frame; a restraint bar operable between a first position engaged with the passenger and second position disengaged with the passenger; and at least one piston operably engaged between the restraint bar and the cart support frame, the piston moveable between a first position engaging the passenger in the seat and a second position disengaged from the passenger in the seat, wherein the piston comprises at least one electromechanical valve operable between an open and a closed position.

Restraint system pistons are provided. The pistons can include: a central chamber housing a piston head and rod; a fluid reservoir in fluid communication with the central chamber; and at least one electromechanical valve operable between an open and a closed position.

Methods for restraining a passenger within a seat are also provided. The methods can include: moving a restraint bar in one direction from a disengaged position to an engaged position to restrain a passenger, the restraint bar being unable to proceed opposite the one direction when engaged; and moving the restraint bar opposite the one direction from an engaged position to a disengaged position after opening a valve in a piston operably coupled to the restraint bar.

Manually operable piston assemblies are provided that can include a piston head within a cylinder, the piston head separating fluid in the cylinder to define rod-side fluid and head-side fluid. The piston assembly can be configured to operate in at least six positions, including but not limited to a first position of locking retract static; a second position of locking retract extend flow; a third position of locking retract flow; a fourth position of locking extend static; a fifth position of locking extend retract flow; and a sixth position of locking extend flow.

Manually operable piston assemblies are also provided that can include a piston head within a cylinder, with the piston head separating fluid in the cylinder to define rod-side fluid and head-side fluid. The manually operable piston assembly can further be configured to operate in at least six positions that include a first position of locking extend static; a second position of extend movement flow; a third position of manual override retract flow; a fourth position of manual override extend flow; a fifth position of locking retract static; and a sixth position of retract movement flow.

Methods for operating a manually operable piston are also provided. The methods can include applying pressure to retract the piston rod and allow head-side fluid to pass through piston head passageway and mix with rod-side fluid.

Methods for operating a manually operable piston can also include applying pressure to extend or retract the piston rod and allow head-side fluid to pass through at least one valve and mix with rod-side fluid.

DRAWINGS

The patent or application file contains at least one drawing executed in color. Copies of this patent or patent application publication with color drawing(s) will be provided by the Office upon request and payment of the necessary fee.

Embodiments of the disclosure are described below with reference to the following accompanying drawings.

FIGS. 5-11 depict example views of a restraint system piston according to embodiments of the disclosure.

FIGS. 12-15 depict additional example views of the restraint system piston of FIGS. 5-11 according to embodiments of the disclosure.

FIG. 32 is an example piston assembly configuration according to an embodiment of the disclosure.

FIG. 33 is an example piston assembly configuration according to an embodiment of the disclosure.

DESCRIPTION

Figure 1:
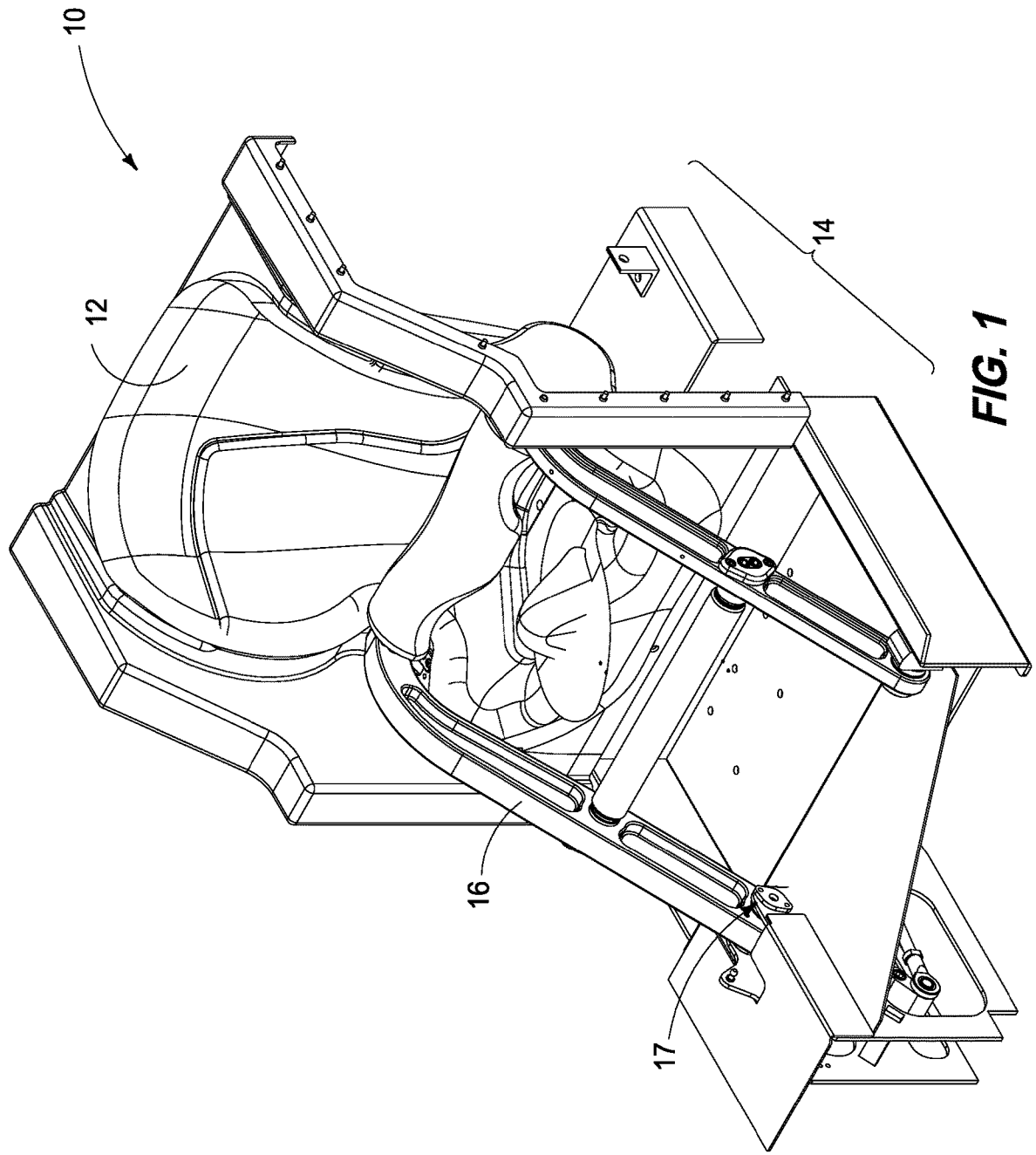
FIGS. 1-4 depict example views of a passenger restraint system according to embodiments of the disclosure.
Figure 2:
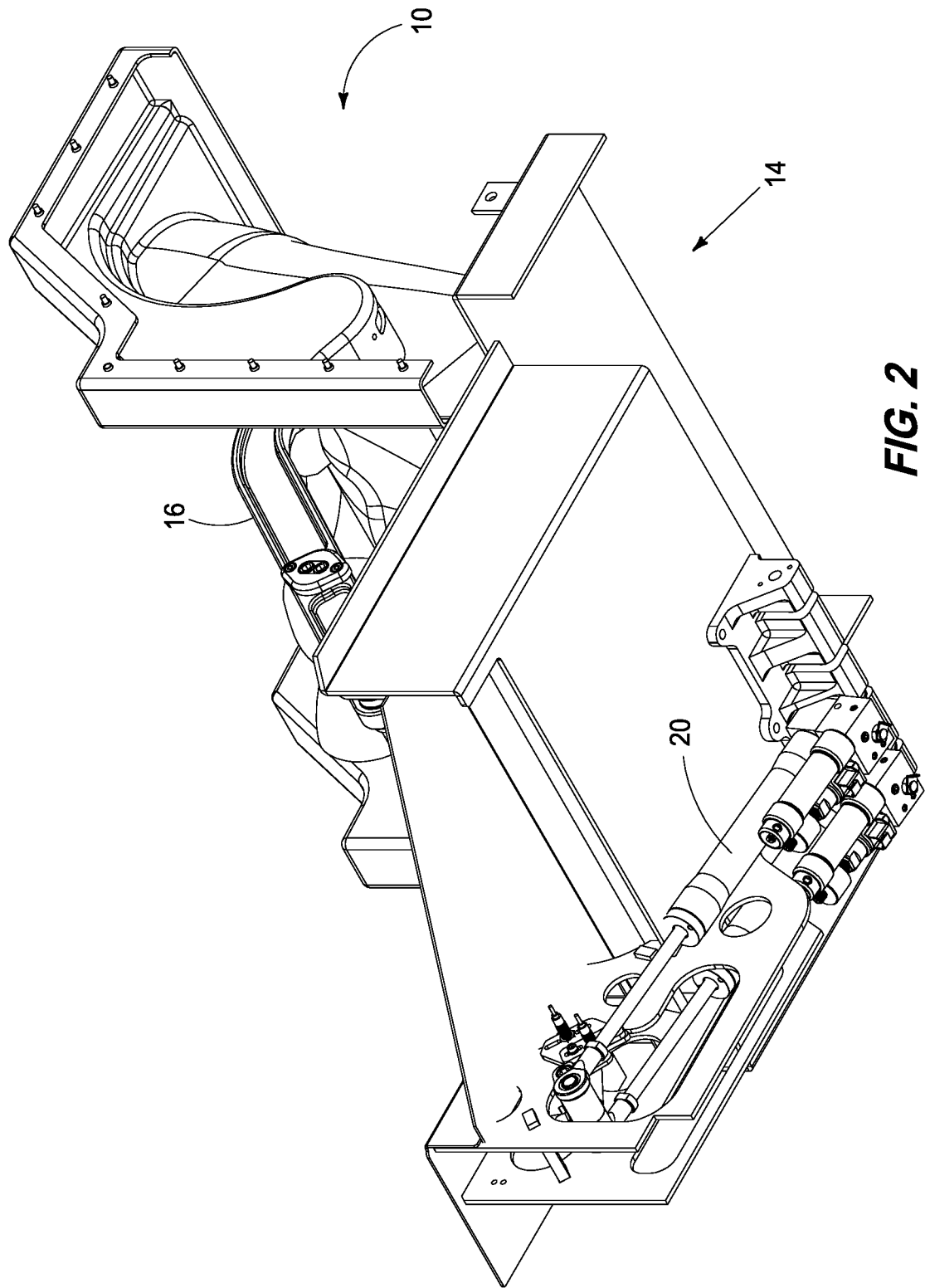
Figure 3:
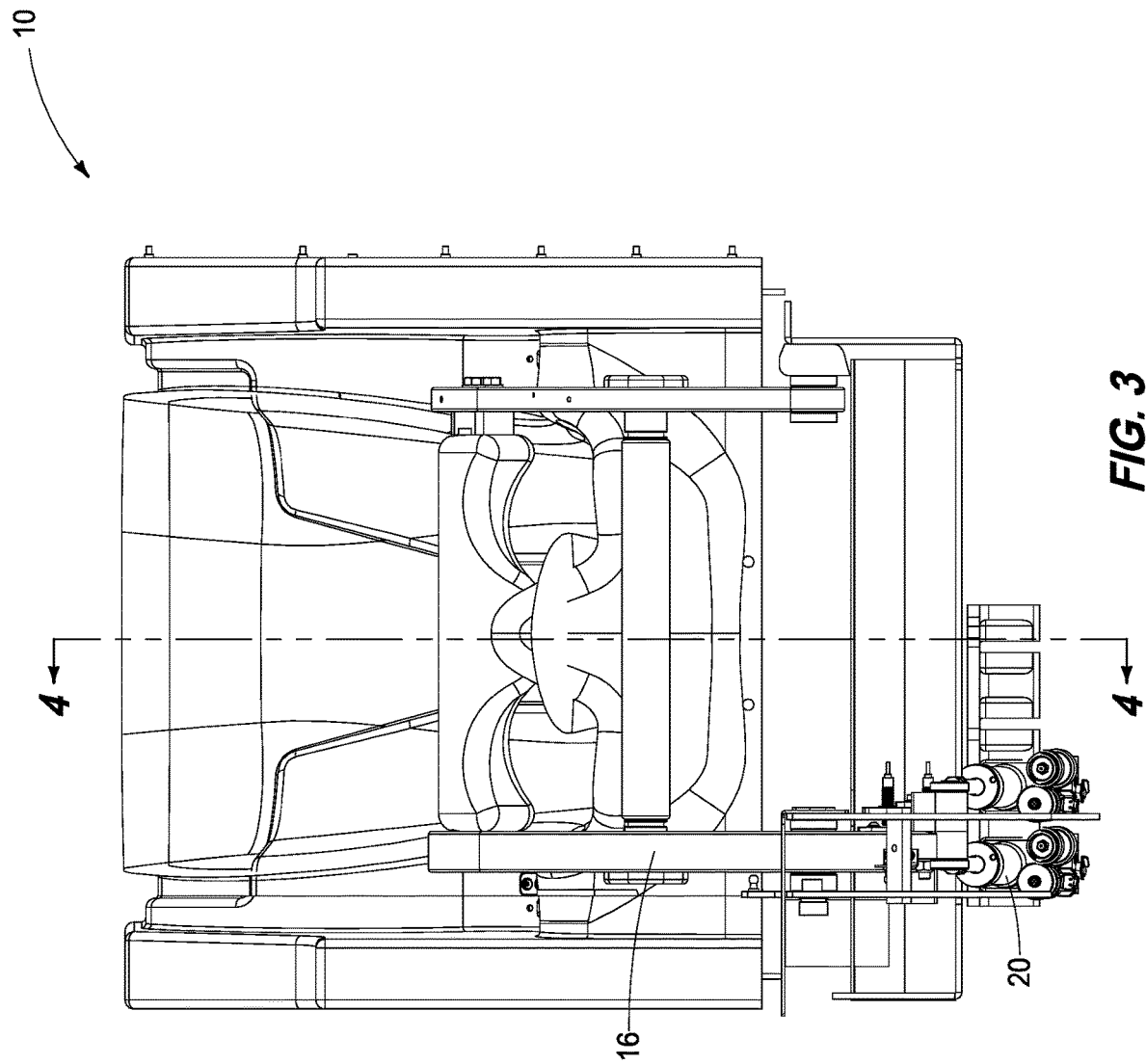
Figure 4:
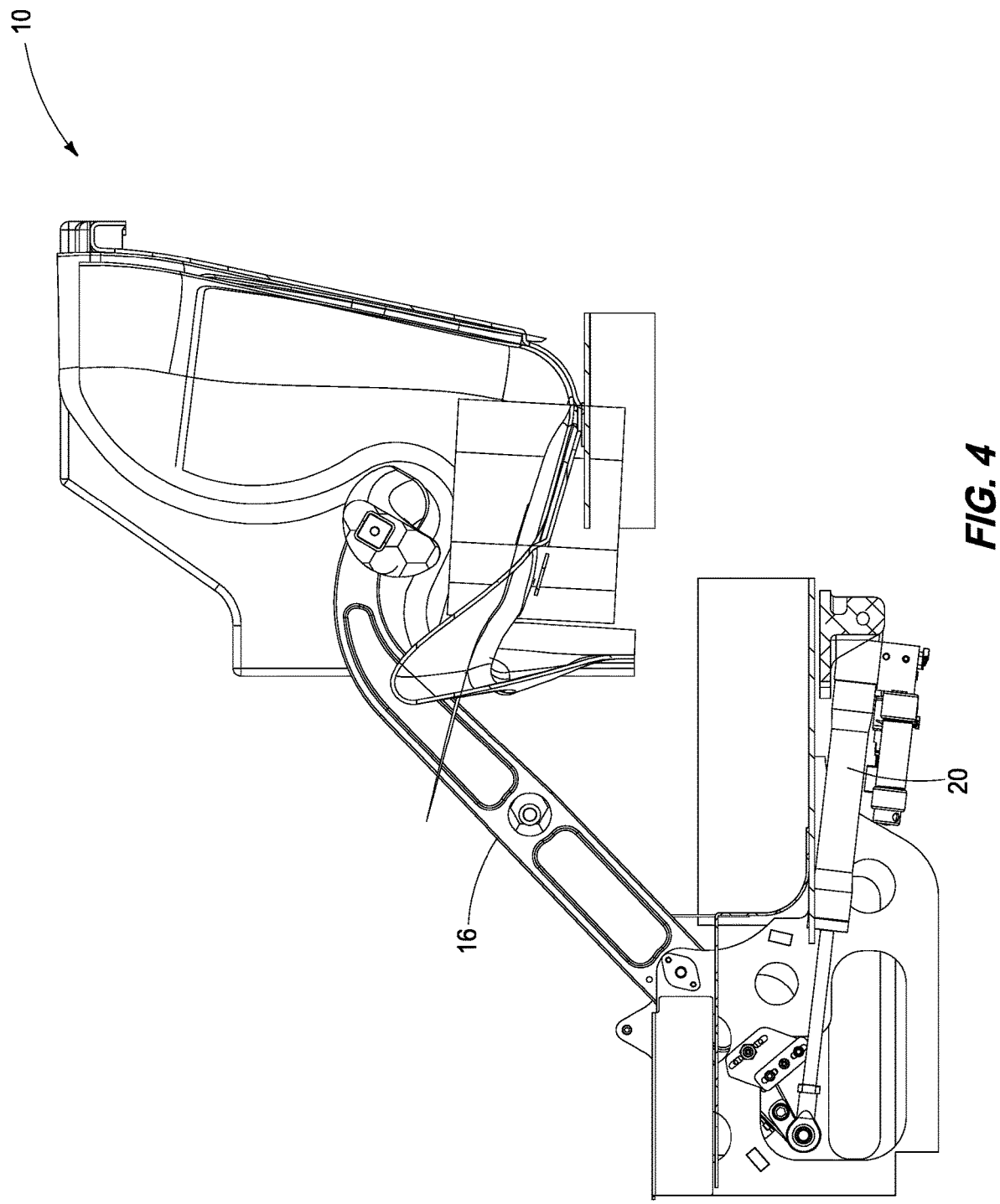
Figure 5:
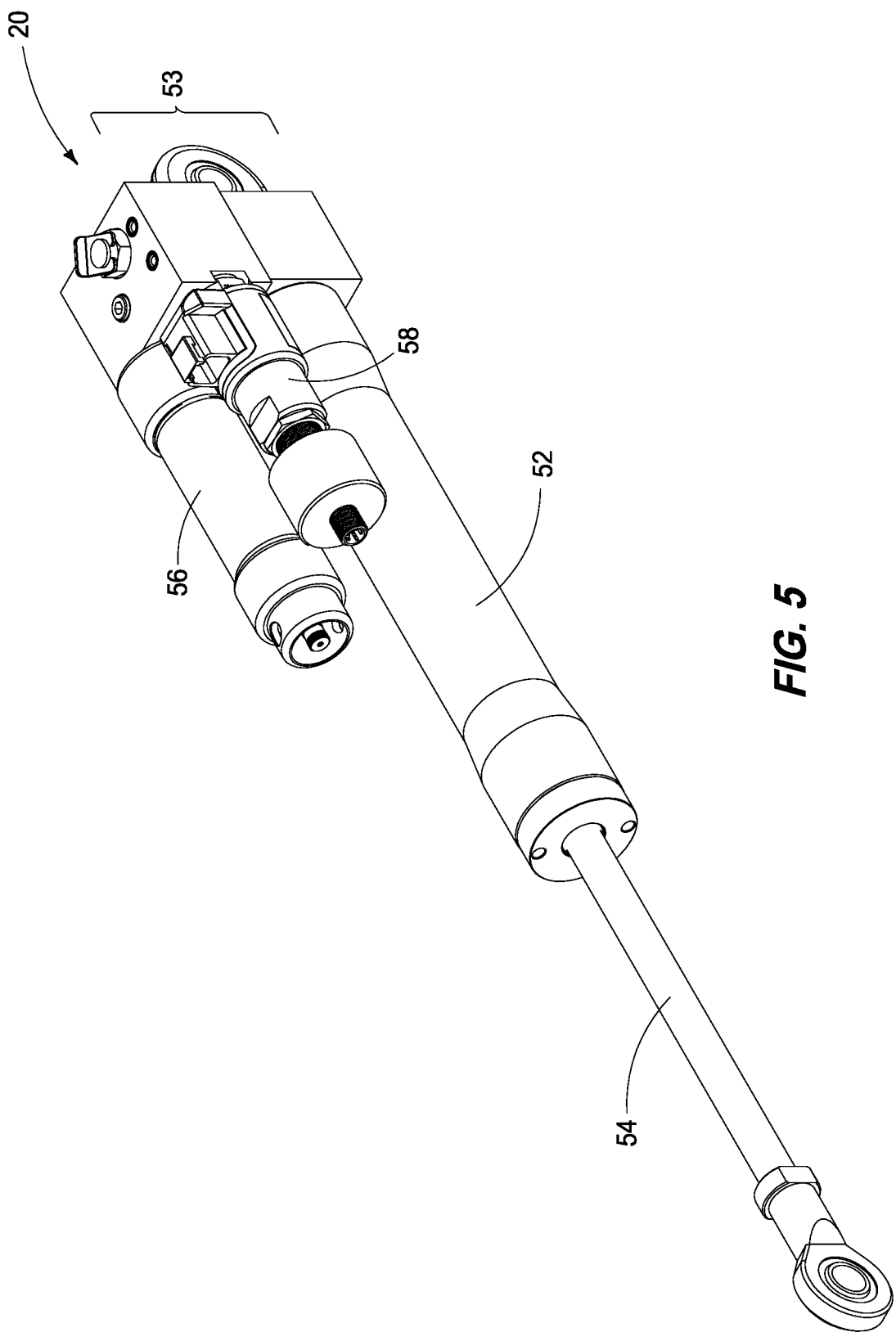
Figure 9:
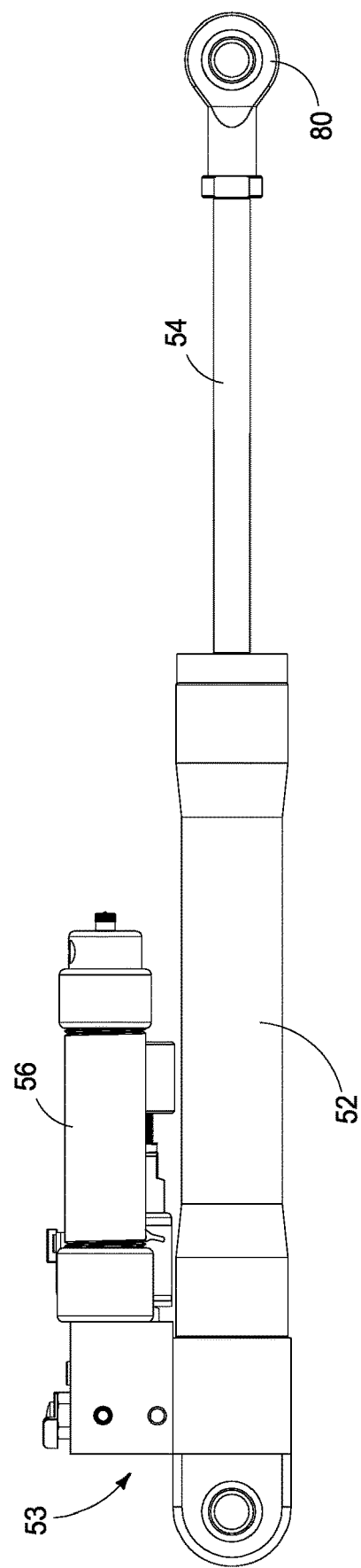
Figure 10:
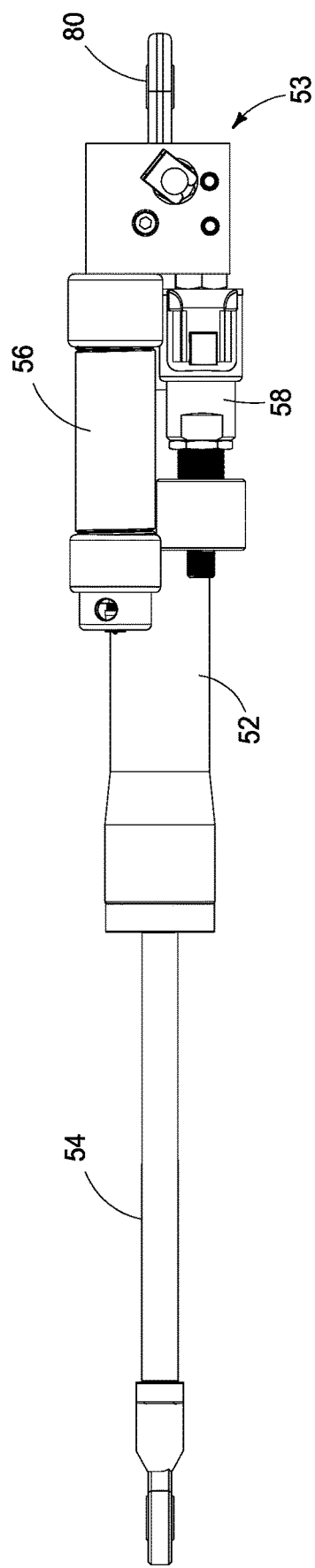
Figure 11:
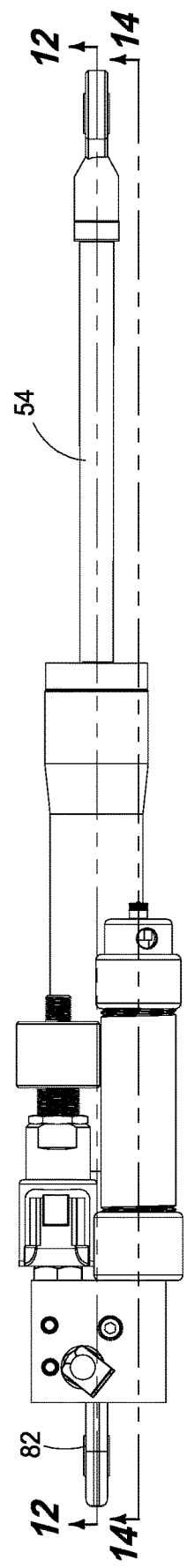
Figure 12:
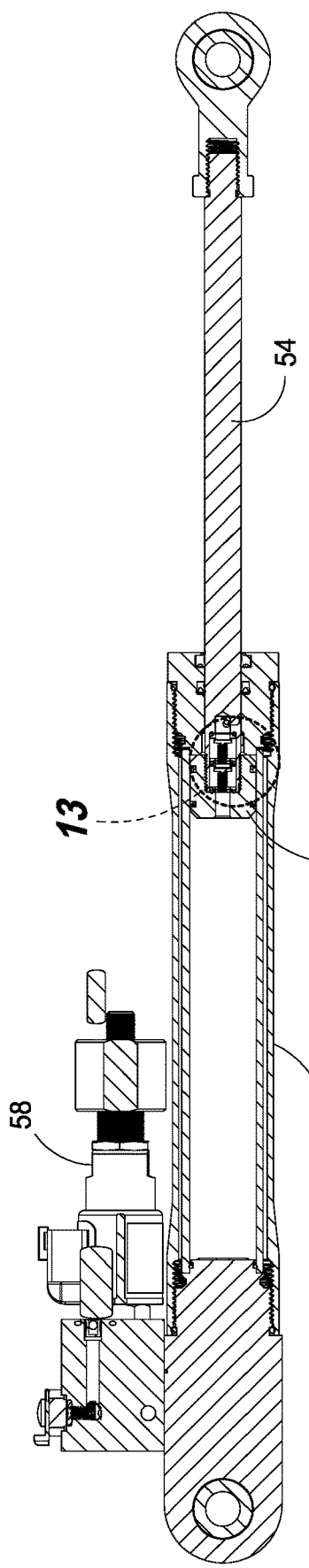
Figure 13:
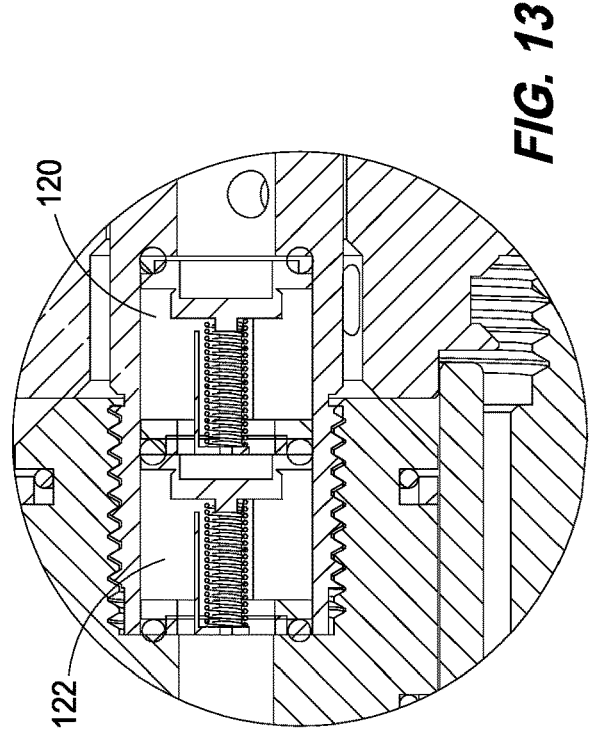
Figure 16:
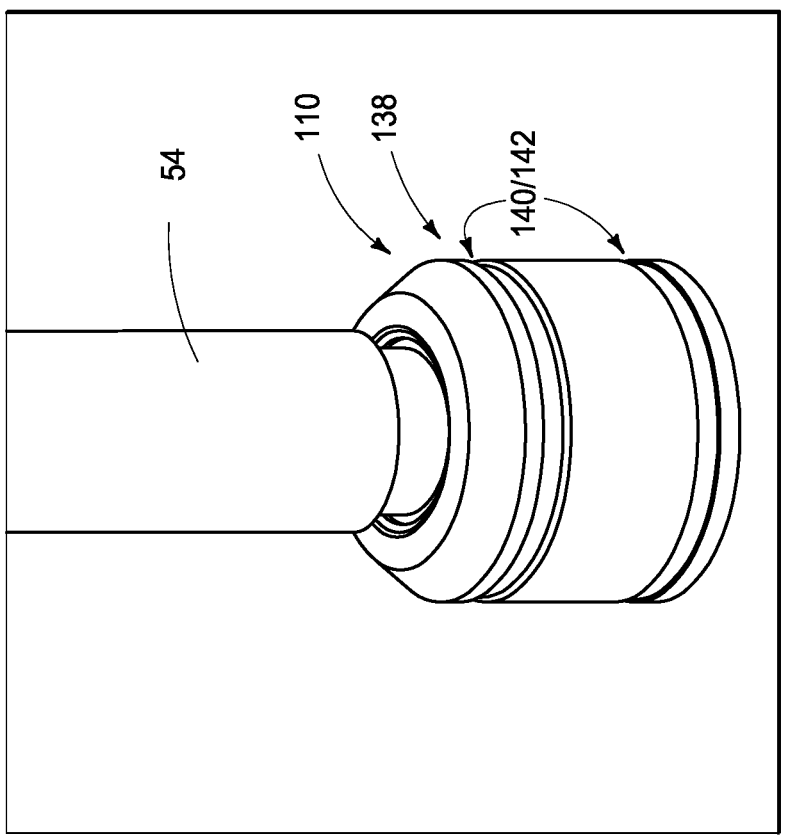
FIGS. 16-18 depict example views of a piston head and rod assembly of the restraint system pistons according to embodiments of the disclosure.
Figure 17:
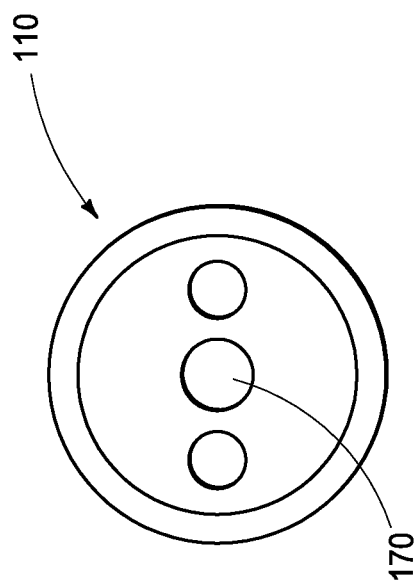
Figure 18:
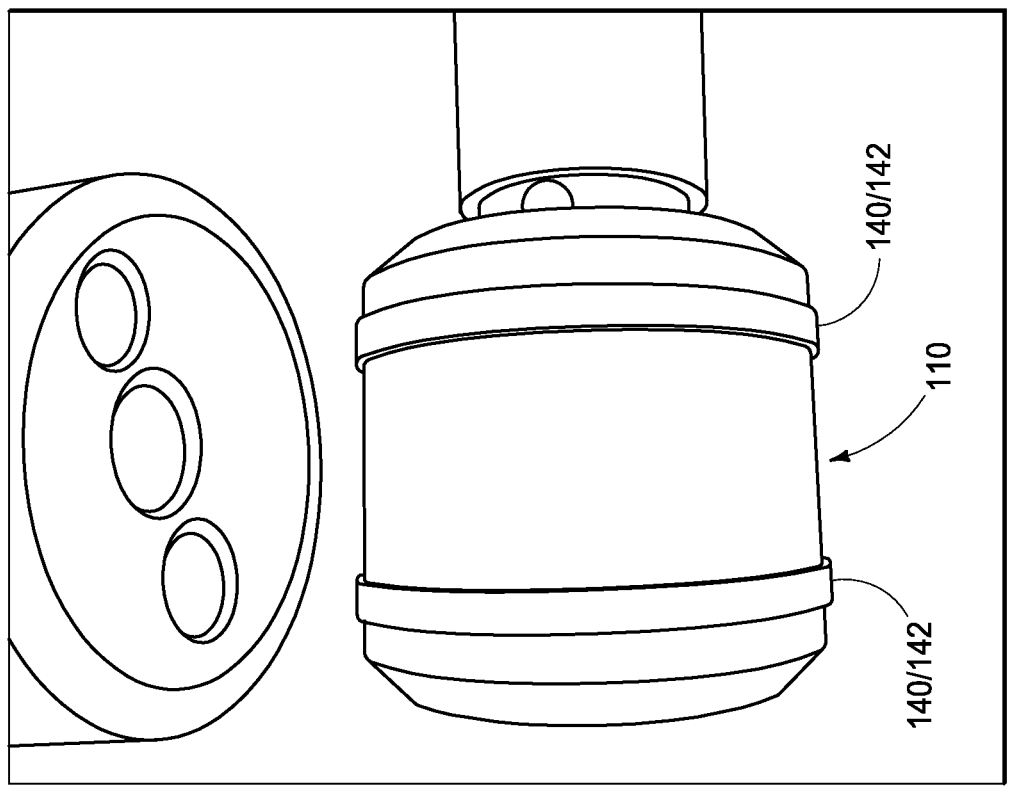
Figure 19:
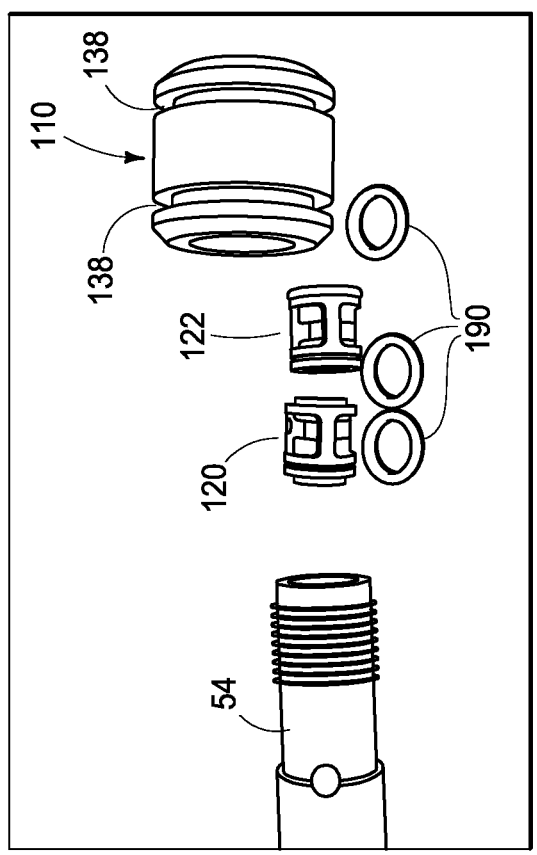
FIGS. 19-20 depict disassembled views of the piston head and rod assembly of FIGS. 16-18 according to embodiments of the disclosure.
Figure 20:
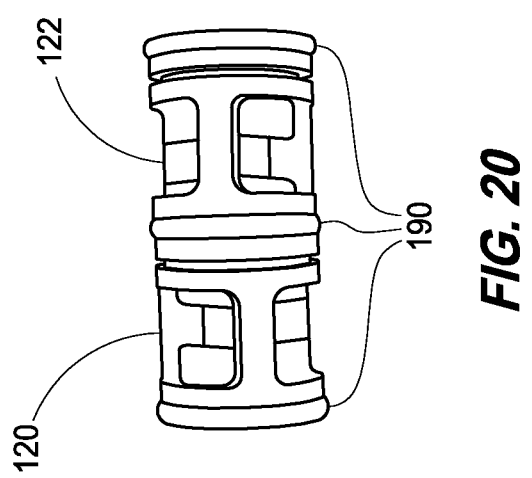

This disclosure is submitted in furtherance of the constitutional purposes of the U.S. Patent Laws "to promote the progress of science and useful arts" (Article 1, Section 8).

The systems and methods of the present disclosure will be described with reference to FIGS. 1-35. Referring first to FIGS. 1-4, views of example restraint systems are shown. In accordance with example implementations, the restraint system 10 can include a passenger seat 12 supported by a frame 14. Frame 14 can be a frame assembly or solid frame for example.

System 10 can include a restraint bar 16 pivotably attached at 17 to frame 14. This can be considered a combination lap bar and a car chassis for example. System 10 can include at least one piston 20; multiple pistons may be used as shown, operably engaged between bar 16 and frame 14. Piston 20 can be moveable between a first position engaging the passenger in seat 12 (as shown without passenger) and a second position disengaged from the passenger in the seat (restraint bar allowing access or egress from seat 12).

The piston can be coupled between a lower end of the restraint bar, which pivots upon a pivot point 17 on the car chassis. In accordance with example implementations, the restraint bar can have two positions and rotate variably between the two positions with a full upright and a locked position. The full upright position allows the rider access to the chair, while the locked position restrains the rider within the chair. As can also be seen, there is a place for two pistons operatively engaged with the restraint bar.

Referring next to FIGS. 5-11, a restraint system piston 20 according to an example implementation is depicted that includes a central chamber 52 that may be considered a main cylinder. Chamber 52 is operatively associated with another chamber 56 such as a fluid reservoir. These two chambers can be operatively engaged via a manifold 53. Manifold 53 can facilitate fluid flow between the chambers as well as provide housing for additional valves that may be electromechanically controlled.

Piston 20 can include a rod 54 operatively engaging chamber 52 as well as coupling end 80 of rod 54. Piston 20 can also include electromechanical valve 58 such as a poppet valve. Piston 20 can have chamber 52 aligned below both valve 58 and chamber 56. Chamber 56 and valve 58 may be aligned in parallel as well. In accordance with example implementations, coupling end 82 may be operatively associated with manifold 53.

Referring next to FIGS. 11-15, more detailed views of piston 20 are shown. For example, piston 20 can include a piston head 110 coupled to rod 54. Head 110 can reside with chamber 52 and be configured to allow fluid flow between portions of chamber 52 separated by head 110. Within head 110 can be a pair of check valves 120 and 122. As can be seen one of the check valves 122 resides within head 110 while the other of the check valves can reside at least partially within rod 54.

Further, chamber 56 can include another head 14 configured to provide positive pressure within chamber 56. Each of these heads can define recesses such as recess 138 configured to receive multiple gaskets 140 and 142. Pairs of gaskets 140 and 142 within the recesses 138 may be constructed of differing materials.

Referring next to FIGS. 16-20, more detailed views of head 110/rod 54 assembly are shown. Terminus of head 110 can include opening 170 to facilitate the flow of fluid through head 110 and between portions of chamber 52. Gaskets 140/142 may reside partially outside recesses 138 when disengaged from chamber 52. Additional gaskets 190 may be provided between check valves 120 and 122 when these check valves are provided in series. The piston head in the main cylinder, the heads themselves can have both a combination of rubber and/or Teflon rings associated therewith which allow the cylinders to slide more freely and be more durable, thereby lasting substantially longer than prior art locking cylinders. The cylinder head is shown with a Teflon and a rubber O-ring. The Teflon O-ring can be supported by a rubber O-ring. The cylinder head may also include two Teflon rings. Both of these Teflon rings can be supported by rubber O-rings.

Figure 21:
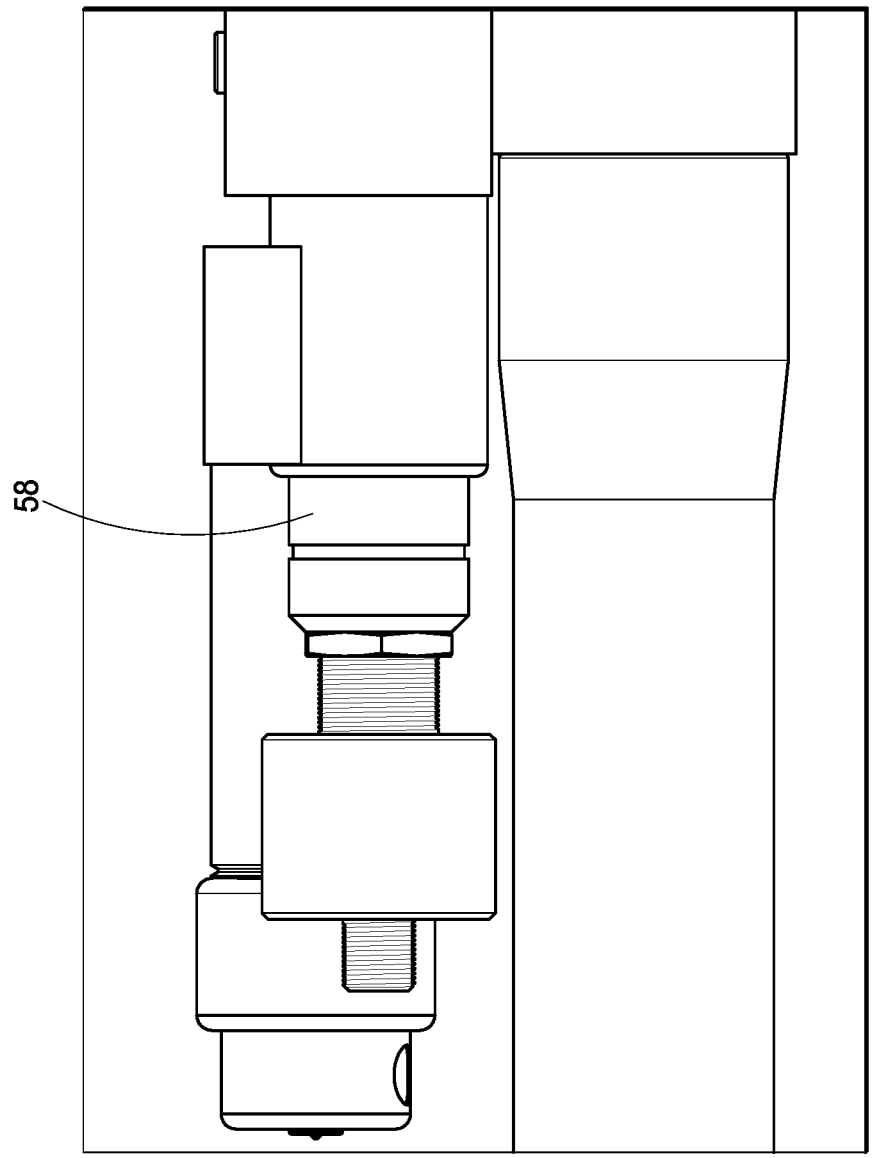
FIGS. 21-23 depict views of an electromechanical valve assembly according to embodiments of the disclosure.
Figure 22:
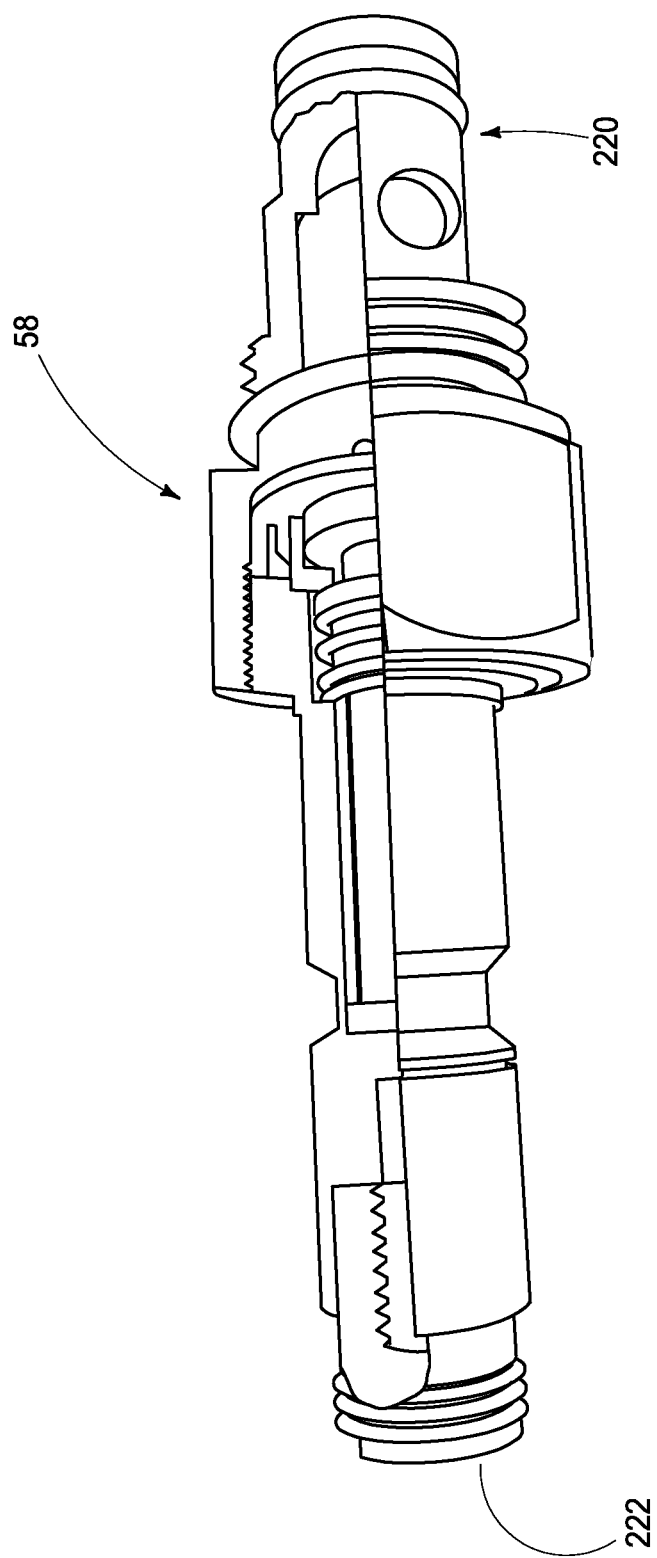
Figure 23:
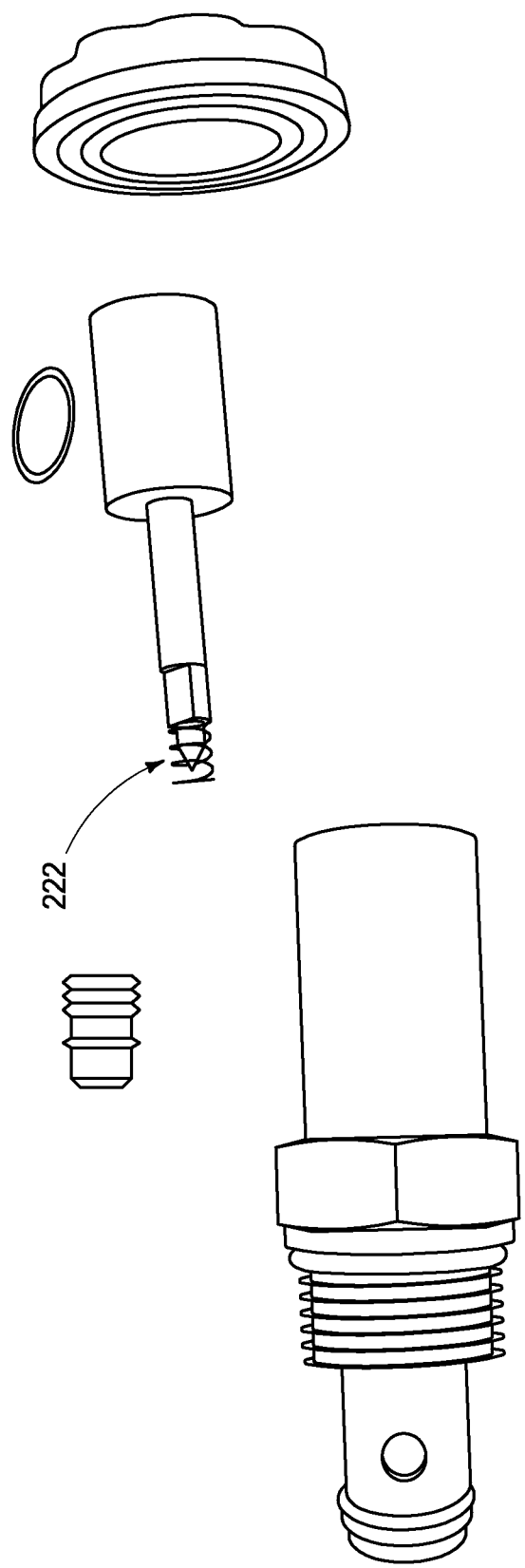

Referring next to FIGS. 21-23, more detailed views of electromechanical valve 58 are shown. In accordance with example implementations, valve 58 can include a valve end 220 that is operatively aligned within the manifold and electronically controlled. Further, valve 58 configured as a poppet valve can include a structure 222 that is mechanically coupled to valve end 220, wherein when valve end 220 is open the structure 222 is in one position in relation to valve 58 and when valve end 220 is closed, structure 222 is in another position. The position of structure 222 can be monitored electronically to verify open/closed configuration of valve end 220.

According to example implementations and methods, as the piston and rod engage the main cylinder, fluid is displaced between opposing sides of the piston head as well as the reservoir cylinder. When fluid is freely exchanged between those three zones within the locking cylinder, the piston can traverse the extent of the main cylinder freely. However, when fluid is restricted between the reservoir and the main cylinder, the piston rod can be locked in place. With the use of operatively aligned check valves, the rod and piston can be restricted from movement in one direction when locked but allowed to move in the opposite direction. In accordance with example implementations, as to prevent fluid from moving in and out of the reservoir, a poppet valve assembly can be de-energized to fix a poppet valve to restrain fluid flow in at least one direction when using a check valve to allow flow in the opposite direction, thereby preventing the piston from moving in at least one direction.

The poppet valve can include an energizer coil that can be used to fix the poppet valve assembly in that one locking position. Accordingly, when the poppet valve assembly is fixed in that one position, fluid can only move in one direction and not in both directions, thereby preventing the piston and rod from moving in at least one direction. In accordance with example implementations, this can be considered the lap bar moving further in the restraining position while being unable to move in the unrestrained position.

In accordance with example implementations, the present disclosure also provides a monitored valve to ensure that the valve is in the engaged position and not in the dis-engaged position. In accordance with example implementations, that can include engaging a mechanical rod to the valve and monitoring the position of that mechanical rod. The monitored poppet valve assembly can include an energizing portion with an industrial electrical plug and a monitoring portion to the left with a 5-pin assembly. The monitoring portion can be associated with a fluid exchange portion that entertains the reservoir piston as well as the main piston.

While recommended sizes are shown and depicted in the accompanying drawings, these should not be considered limiting the scope of this disclosure as the only operable size that will per operable. What should be considered is that the poppet valve is actually monitored to be in the engaged position, which is a first in the industry. In accordance with example implementations, operator houses and amusement rides can now be equipped with panels that can indicate the engaged or dis-engaged position of the poppet valve. In certain circumstances, this can be a double check to an attendant walking the cars and checking to ensure that they are in a locked position prior to engaging the ride. Also, upon use and testing, the ride can be monitored to ensure that the locking valves are engaged and therefore in the locked position. While not depicted in the present application, it is envisioned that a panel can include a representation of a car or multiple cars with individual seats, and each individual seat having an engaged or "go" or "no go" light associated therewith, allowing an operator to review same, and if all are in "go" positions, allowing the ride to proceed, but if only one is a "no go" position, that restraint is checked to make sure it is working properly and if not, that seat is removed from service. This is a substantial increase in the safety of amusement rides worldwide and is the first time that these kinds of precautions have been viewed by an operator remote from the ride itself.

The present disclosure provides increased safety for retaining the restraint system in place by using a modified locking cylinder such as a single locking cylinder that may be used in duplicate for each lap restraint. Therefore, there may be two single locking cylinders.

Figure 24:
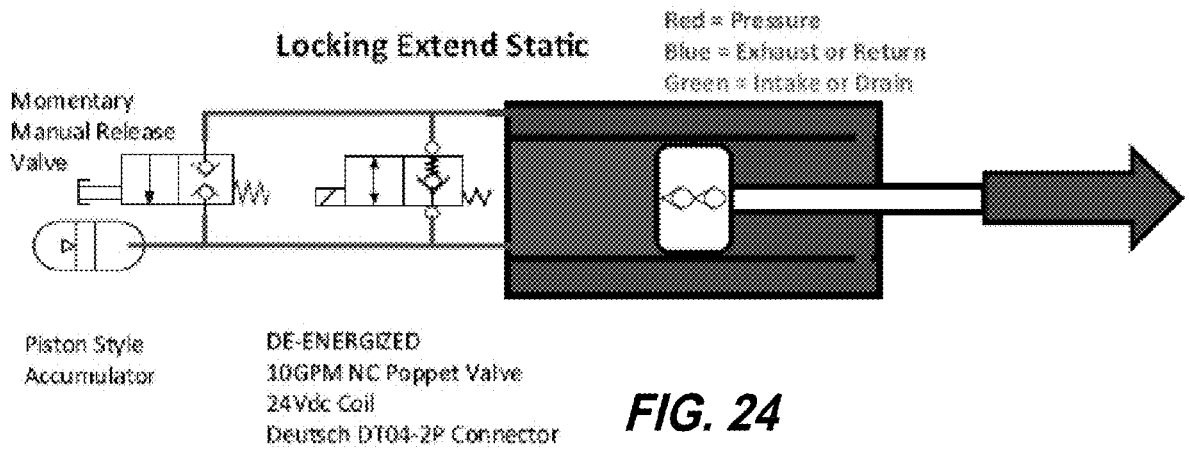
FIG. 24 is an example piston assembly configuration according to an embodiment of the disclosure.

Configurations and methods for manually operable piston assemblies are provided with reference to FIGS. 24-35. Referring to FIG. 24, a manually operated piston assembly is depicted that includes a piston head engaged within a piston cylinder, the piston head dividing rod-side fluid indicated in blue and head-side fluid indicated in red. In this configuration of FIG. 24, the configuration is locking retract static which is also the same as locking extend static, wherein the rod-side and head-side fluids do not mix via a valve within the rod head or exterior valves, such as poppet valves or momentary manual release valves. This can also be stated for FIG. 27 as well.

Figure 25:
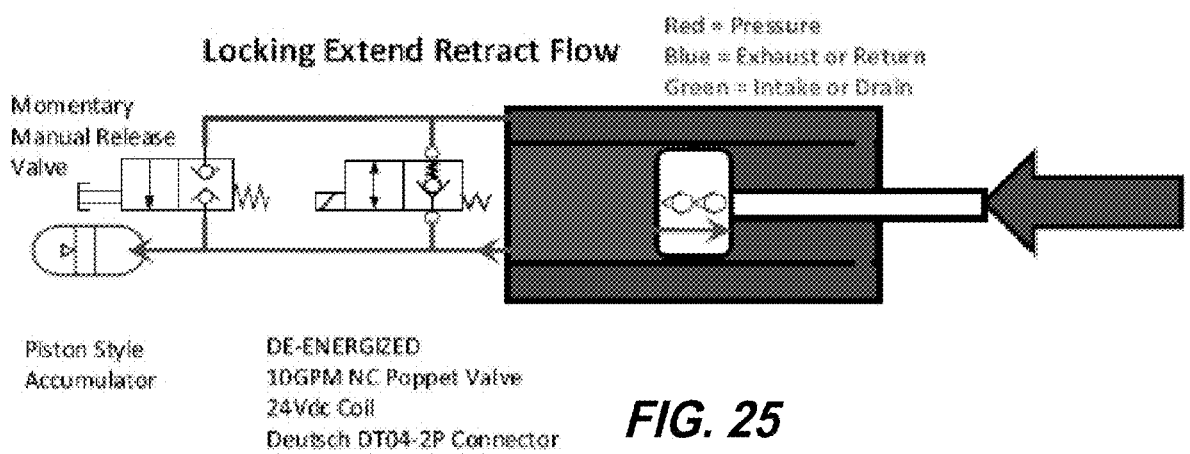
FIG. 25 is an example piston assembly configuration according to an embodiment of the disclosure.
Figure 28:
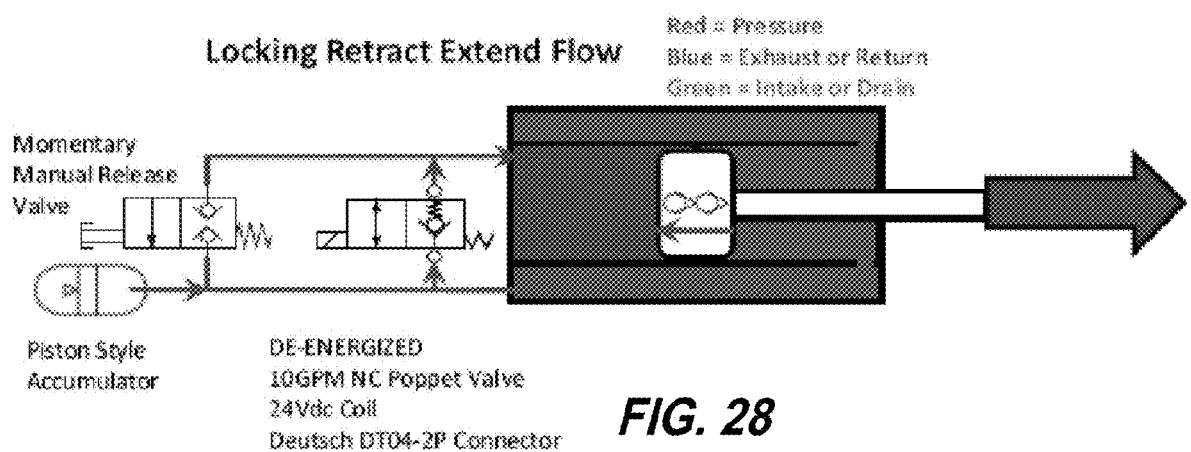
FIG. 28 is an example piston assembly configuration according to an embodiment of the disclosure.

Referring next to FIGS. 25 and 28, in accordance with example implementations, the manually operable piston assembly can be configured to allow head-side fluid to mix with rod-side fluid. In accordance with the example depiction in FIG. 25, this head-side fluid can mix in one direction towards the rod-side fluid, and also the head-side fluid can be allowed to move in the direction of the piston style accumulator. Both are not required, but may be utilized at the same time. In accordance with example implementations, this allows the rod to be retracted but does not allow the rod to be extended in this configuration. Referring to FIG. 28, in the locking retract extend flow configuration, rod-side fluid is allowed to flow past the piston head to head-side fluid and mix therewith, allowing the rod to be extended but not retracted. In accordance with example implementations, this configuration also allows for at least one valve to be opened and allow accumulator fluid to pass through the valve and mix with piston head-side fluid.

Figure 26:
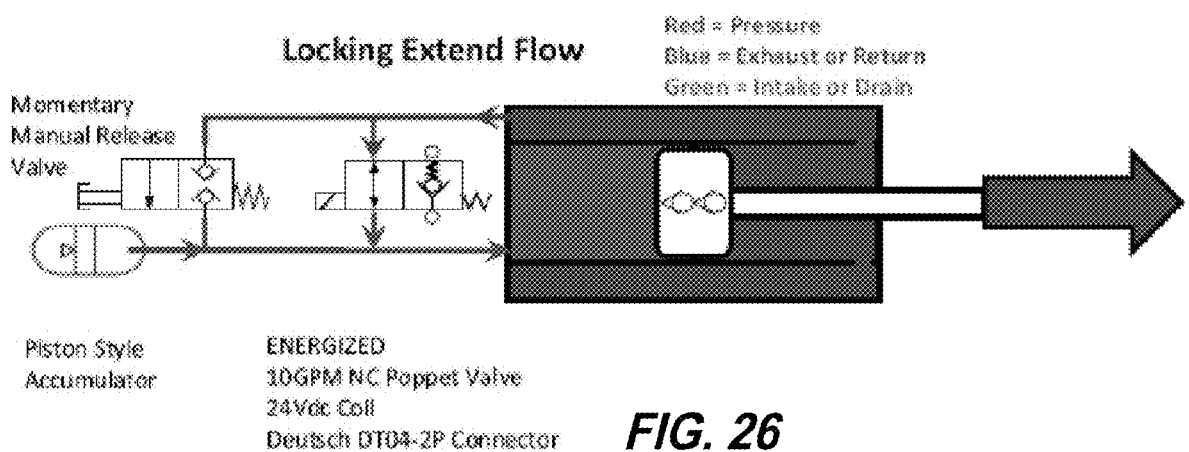
FIG. 26 is an example piston assembly configuration according to an embodiment of the disclosure.
Figure 27:
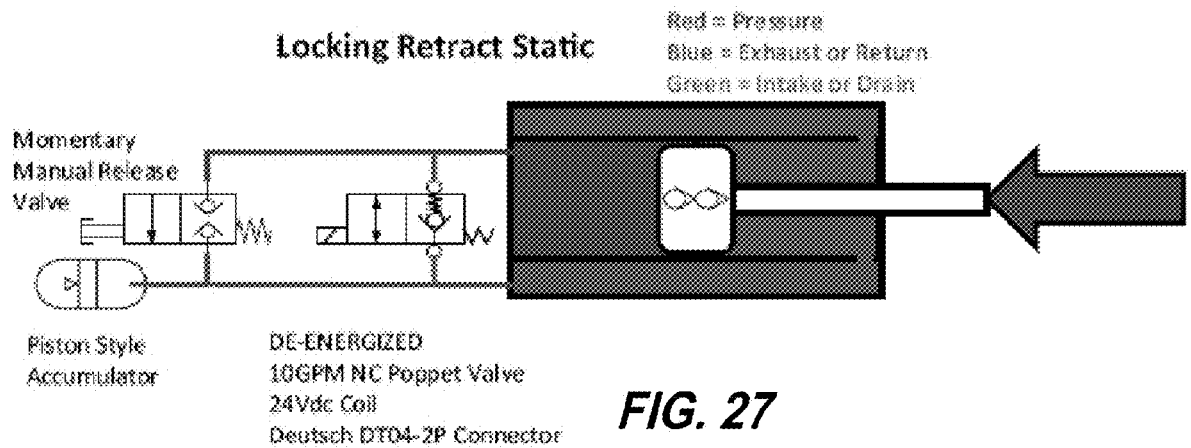
FIG. 27 is an example piston assembly configuration according to an embodiment of the disclosure.
Figure 29:
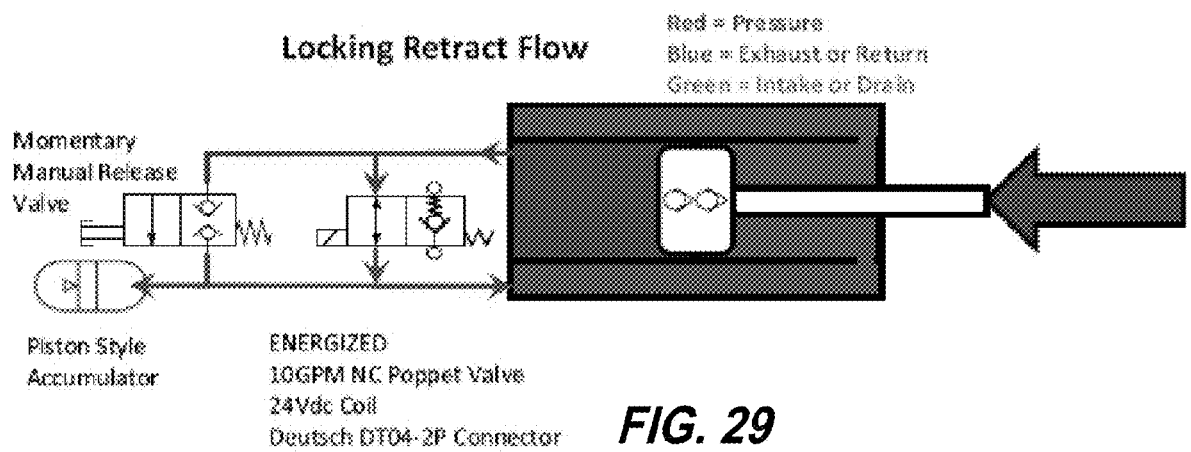
FIG. 29 is an example piston assembly configuration according to an embodiment of the disclosure.
Figure 30:
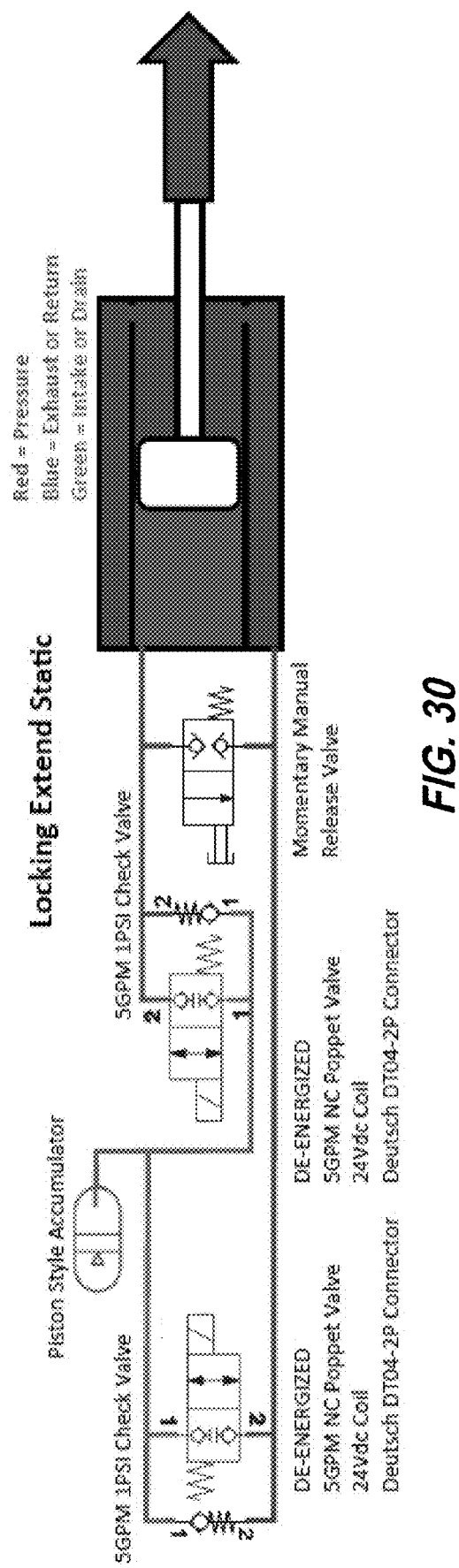
FIG. 30 is an example piston assembly configuration according to an embodiment of the disclosure.

In accordance with another example configuration and with reference to FIGS. 26 and 29, locking extend flow and locking retract flow configurations are also shown. As shown in these configurations, rod-side fluid and head-side fluid are not allowed to mix across the piston head, but are allowed to mix via one or more valves associated with the piston head assembly. With reference to FIG. 26, in order to allow the piston rod to extend, a valve is opened to allow rod-side fluid to mix with piston-side fluid via the valve without allowing a reverse flow of that configuration. With reference to FIG. 29 locking retract flow configuration, the rod is not allowed to extend but can be retracted, allowing flow in a single direction across a valve. In accordance with example implementations and as shown with reference to the figures, the valves can include poppet valves and manual release valves in a series or as shown herein.

Figure 31:
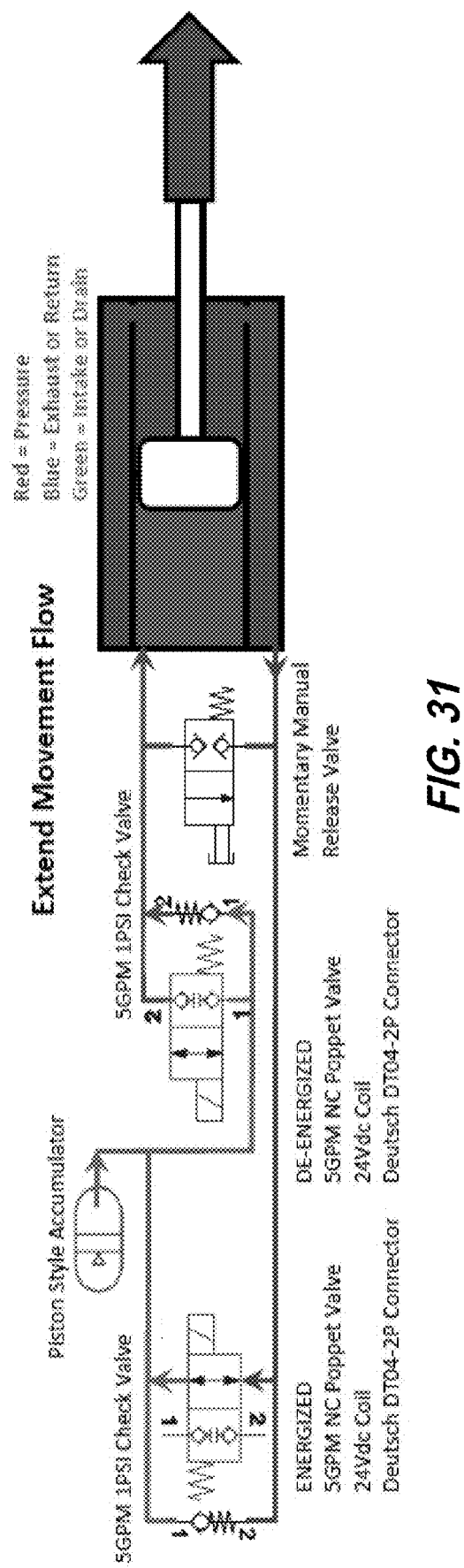
FIG. 31 is an example piston assembly configuration according to an embodiment of the disclosure.
Figure 34:
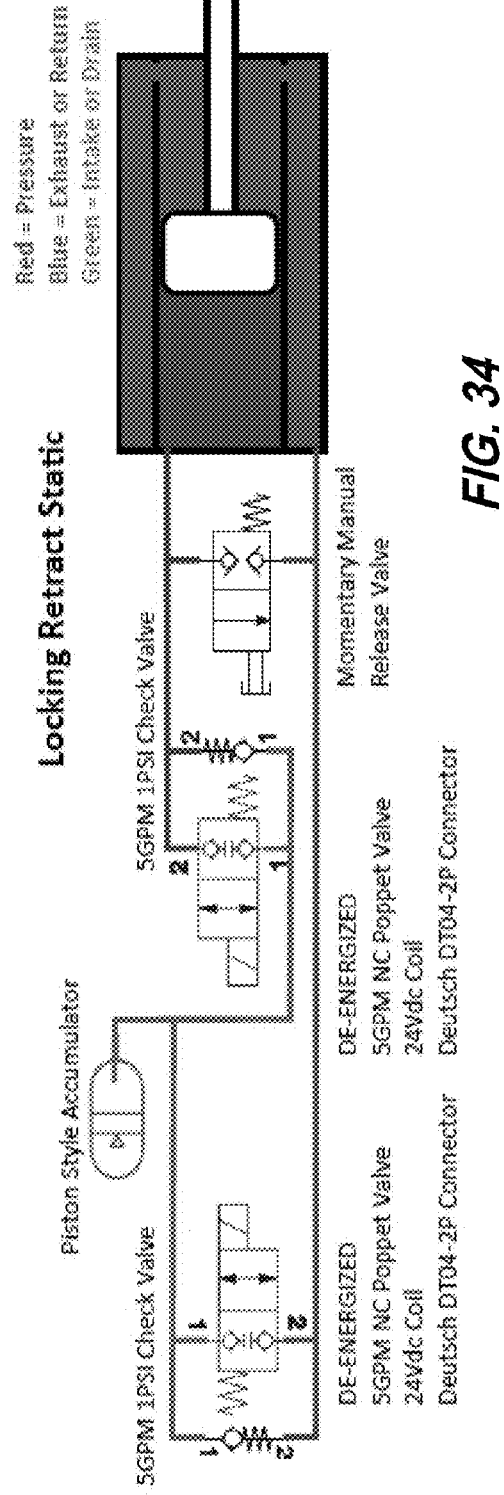
FIG. 34 is an example piston assembly configuration according to an embodiment of the disclosure.
Figure 35:
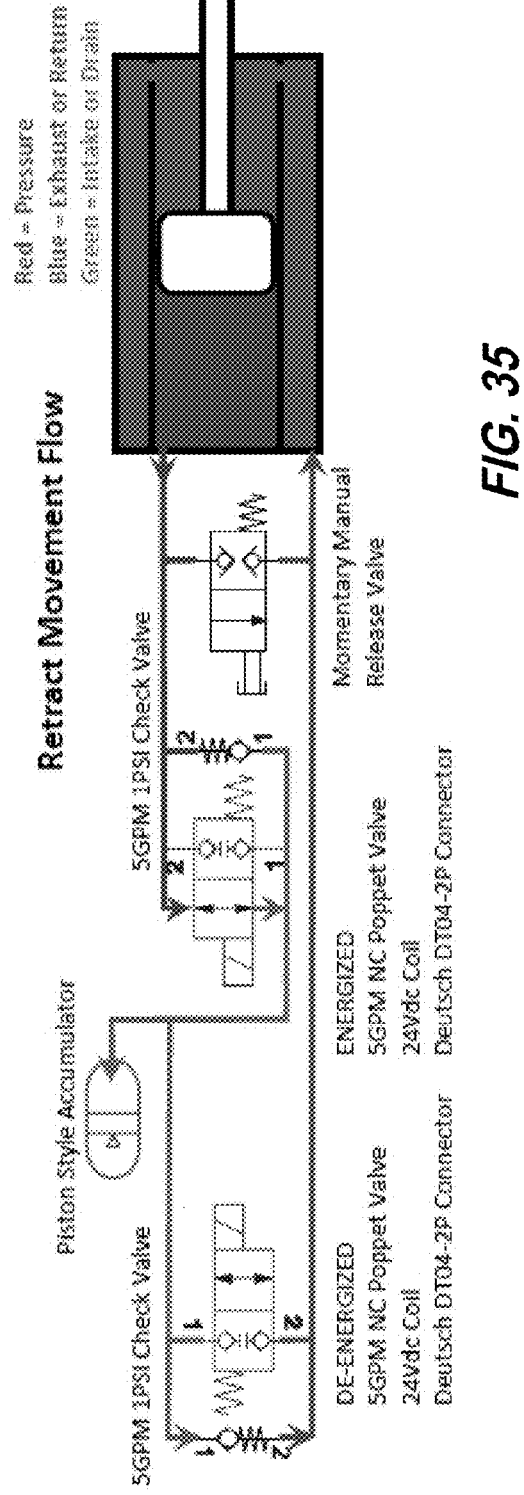
FIG. 35 is an example piston assembly configuration according to an embodiment of the disclosure.

Referring next to FIGS. 30-35, configurations of a manually operable piston assembly are also shown. These configurations do not include configurations that allow for head-side fluid to mix with rod-side fluid across the piston head; rather, these configurations utilize a series of valves as well as the piston style accumulator to allow for configurations of the piston assemblies. In accordance with example configurations in FIGS. 30 and 34, as can be seen, flow between the piston-side and rod-side fluids remain static, allowing the rod and piston to be locked in place at that portion. Referring next to FIGS. 31 and 35, the valves can be configured to allow the rod-side and head-side fluids to mix across a poppet valve in one configuration as well as another poppet valve to allow the flows to mix.

With reference to FIGS. 32 and 33, rod-side fluid and head-side fluid can be allowed to mix via an enabled momentary manual release valve which allows for manual override of extend flow or retract flow, allowing the operator of the assembly to dictate that the rod goes in one direction rather than another, according to the desired configuration.

With reference to FIGS. 34 and 35 locking retract static and retract movement flow, rod-side fluid and head-side fluid can be mixed by configuring the two check valves while leaving the momentary manual valve closed.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:
1. A manually operable piston assembly comprising:
 a piston head within a cylinder, the piston head separating fluid in the cylinder to define rod-side fluid and head-side fluid, wherein the piston head is operably coupled to a seat restraint bar; and a piston style accumulator in fluid communication with the head-side fluid;

at least one check valve operably arranged to control fluid between the rod-side fluid and the head-side fluid;

at least another check valve operably arranged to control fluid between the head side fluid and the piston style accumulator; and the piston and check valves configured to operate in at least six positions comprising:
- a first position of locking extend static;
- a second position of extend movement flow;
- a third position of manual override retract flow;
- a fourth position of manual override extend flow;
- a fifth position of locking retract static; and
- a sixth position of retract movement flow.

2. The piston assembly of claim 1 wherein in the first and fifth positions, the head-side and rod-side fluids do not mix.

3. The piston assembly of claim 1 wherein in the second and sixth positions, the head-side and rod-side fluids pass through one or more of the check valves to mix.

4. The piston assembly of claim 1 wherein in the third and sixth positions, the head-side and rod-side fluids pass through a manual release valve.

\* \* \* \* \*